United States Patent [19]

Petrak

[11] 4,316,972

[45] Feb. 23, 1982

[54] POLYMERS FROM NITROGEN HETEROCYCLIC COMPOUNDS

[75] Inventor: Karel L. Petrak, North Harrow, England

[73] Assignee: Eastman Kodak Company, Rochester, N.Y.

[21] Appl. No.: 150,038

[22] Filed: May 15, 1980

Related U.S. Application Data

[62] Division of Ser. No. 960,213, Nov. 13, 1978, Pat. No. 4,229,515.

[51] Int. Cl.³ .............................. C08F 8/34; C08F 8/32; G03C 5/54; C08F 8/42
[52] U.S. Cl. .................................. 525/336; 430/213; 526/240; 526/241; 526/257; 526/258; 526/259; 526/265; 525/351; 525/353; 525/370; 525/371; 525/374; 525/379; 525/382; 525/384; 525/385; 525/359.6
[58] Field of Search ............... 525/336, 343, 349, 351, 525/353, 359, 379, 382, 384, 385; 526/258, 259, 265

[56] References Cited

U.S. PATENT DOCUMENTS 3,758,445 9/1973 Cohen ............................ 526/265 X Primary Examiner—C. A. Henderson
Attorney, Agent, or Firm—Arthur H. Rosenstein

[57] ABSTRACT

A photographic element comprises a support having thereon a layer containing a novel polymer comprising a recurring unit having the formula:

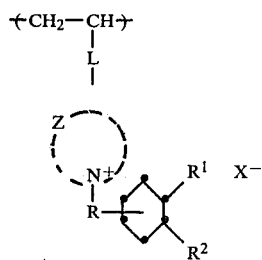

said element comprising a source of metal ions. The elements are useful in diffusion transfer processes, and particularly useful with chelating dyes or dye-forming materials to provide a metallized dye image.

1 Claim, No Drawings

POLYMERS FROM NITROGEN HETEROCYCLIC COMPOUNDS

This is a division of application Ser. No. 960,213, filed Nov. 13, 1978 now U.S. Pat. No. 4,229,515 issued Oct. 21, 1980.

The present invention relates to novel polymers and photographic elements containing said polymers, which polymers coordinate with metal ions to form complexes.

The use of various dyes and dye-forming materials in photographic processes, and particularly in image transfer processes, has been known for quite some time. In many cases, however, dye image stability has been a problem in that the dyes may tend to wander from the image-receiving layer after processing and, additionally, over a period of time the image fades, due to light exposure, etc.

The use of metal complexes of some ortho substituted azo dyes in image transfer processes reduces fade, as these metallized dyes have been found to be extremely light resistant.

Premetallized dyes are described in U.S. Pat. Nos. 3,081,167 and 3,196,014, and British Patent Nos. 905,701 and 1,121,995, wherein premetallized dye developers are coated in the image-forming element of an image transfer film unit and are released as a function of exposure and development. The released dye developers then diffuse to an image-receiving layer. In some instances, a metallic salt can be in a receiving layer and the dye or dye-forming material can be metallizable, rather than premetallized. That is, the dye or dye-forming material contains groups which will chelate with the metal ions to form the metallized dyes in the receiver.

It has been found that the metallizable dye approach has the advantages of faster diffusion, in some cases, and the ability to use the metallization step as a dye hue shifting mechanism. The use of a metallizable dye or dye former, however, requires the use of a metallizing image-receiving layer. In most instances, metal ions coated in the receiving layer tend to wander, which causes deleterious sensitometric effects in the light-sensitive emulsion layer and an increase in access time for viewing the transfer image due to premature metallization. Further, since the metal ion source would be located in the image-receiving layer, unwanted color and stain under basic or acidic conditions may occur.

In copending U.S. Application Ser. No. 944,477, filed Sept. 21, 1978 by Archie and Campbell, entitled "Photographic Elements Containing Polymers Which Coordinate with Metal Ions," a film unit is described which comprises a support, a chelating dye or dye-forming material and a mordant receiving layer, said mordant receiving layer having associated therewith a polymer containing groups which form coordination complexes with metal ions, and a source of said metal ions associated with the polymer. This reduces the diffusion of metal ions throughout the film unit, and still allows for rapid metallization of the dye or dye-forming material in the vicinity of the mordant so that the metallized dye and mordant can complex with a minimum of dye or metal ion wandering.

I have found a novel polymer containing chelating groups which can be used in an image-receiving element to complex with metal ions and which will coordinate to an imagewise-diffused chelating dye or dye-forming material. The resulting dye image is stable to heat and light over long periods of time.

A polymer in accordance with my invention comprises a water-soluble polymer comprising a recurring unit of the formula:

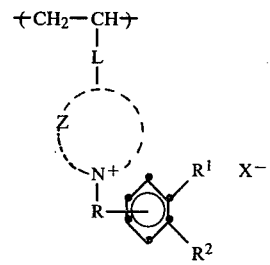

wherein:
L is selected from the group consisting of a single bond and a bivalent linking group;
Z represents the atoms necessary, together with the nitrogen atom, to complete a heterocyclic nucleus;
R is selected from the group consisting of a single bond and alkylene;
$R^1$ and $R^2$ are independently chelating groups; and
$X^-$ is an anion.

The linking group L, if not a single bond, can be any bivalent group connecting the vinyl group to the heterocyclic group. Examples of linking groups useful herein are oxy and alkylene preferably containing from 1 to 6 carbon atoms such as methylene, etc.; arylene preferably containing from about 6 to about 10 carbon atoms such as phenylene, naphthalene and the like; arylenealkylene preferably containing from about 7 to about 11 carbon atoms such as benzyl and the like.

Z can represent the atoms necessary to form a nitrogen-containing heterocyclic nucleus, preferably containing from 5 to 7 members in the ring, such as pyridine; imidazole; quinoline; isoquinoline; phenanthroline; pyrimidine; benzothiazole; benzothiadiazol; purine; pyrazine; acridine and the like. The heterocyclic group can contain other hetero atoms, such as oxygen and sulfur, and can be substituted, such as vinylimidazole, methylimidazole, picoline, and the like.

R can be a single bond or alkylene, preferably containing from 1 to 4 carbon atoms, such as methylene, ethylene, isopropylene, butylene and the like.

$R^1$ and $R^2$ are independently metal chelating groups (any group which will donate a pair of electrons to a metal ion) including a salt thereof (e.g., an alkali metal salt, a quaternary ammonium salt, etc) or a hydrolyzable precursor thereof (e.g., a hydrolyzable acyl or ester group), e.g., hydroxy; amino; carboxy; sulfonamido; sulfamoyl; a hydrolyzable ester group having the formula $-OCOR^{10}$, $-OCOOR^{10}$, $-OCON(R^{10})_2$ or $-COOR^{10}$, wherein $R^{10}$ is an alkyl group having 1 to 4 carbon atoms, such as methyl, ethyl, isopropyl, butyl and the like, or an aryl group having 6 to about 8 carbon atoms, such as phenyl.

Preferred chelating groups are $-OH$, $-COOH$, $-NHR^4$, $-NHCOR^3$, $-NHSO_2R^5$, $-C(R^4)=O$, $-C(R^4)=NR^5$ and $-SO_2 NHR^4$, where $R^3$ is alkyl, preferably containing from 1 to 4 carbon atoms, such as described for R; $R^4$ is H or an alkyl, preferably containing from 1 to 4 carbon atoms, such as described for R; and $R^5$ is an alkyl, preferably containing 1 to 4 carbon atoms, such as described for R; aryl, preferably containing from 6 to 10 carbon atoms, including substituted aryl, such as phenyl, naphthyl, and the like; OH; and NHR⁶, wherein R⁶ is aryl, such as described for R⁵ or CONH₂.

The polymer of this invention preferably contains recurring units of a polymerized mordant for dyes, preferably acid dyes. The preferred mordanting units contain quaternary ammonium groups, such as described in pages 80 to 82 of the November, 1976, edition of *Research Disclosure*.

Specifically, in a most preferred embodiment, the polymer contains mordant units according to the formula:

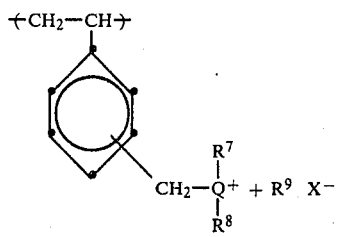

wherein:
Q is N or P;
R⁷, R⁸ and R⁹ are independently selected from the group consisting of acicyclic and alkyl groups; and
X⁻ is an anion.

The most preferred polymer containing units, such as those having the formula above wherein R⁷ and R⁹ are alkyl and R⁸ is benzyl. U.S. Pat. No. 3,958,995 contains further description of these units.

Copolymerized with the monomers described to form the polymer of the invention can be any α, β-ethylenically unsaturated monomer other than those already mentioned, such as vinyl esters, such as methyl methacrylate; butyl acrylate, butyl methacrylate and ethyl acrylate; amides, such as acrylamide, diacetone acrylamide, N-methylacrylamide and methacrylamide; nitriles, such as acrylonitrile and vinylbenzylnitrile; ketones, such as methyl vinyl ketone, ethyl vinyl ketone and p-vinylacetophenone; halides, such as vinyl chloride, vinylidene chloride and vinylbenzyl chloride; ethers, such as methyl vinyl ether; ethyl vinyl ether and vinylbenzyl methyl ether; α,β-unsaturated acids thereof, such as acrylic acid, methacrylic acid and vinylbenzoic acid; olefins, such as ethylene, propylene and butylene; diolefins, such as butadiene and 2,3-dimethylbutadiene and the like, and other vinyl monomers within the knowledge and skill of an ordinary worker in the art.

The polymer can comprise from about 1 to about 100 percent by weight of one or more mordanting units and from about 0 to about 99 percent by weight of the other polymerized ethylenically unsaturated monomer, preferably from 10 to 30 weight percent of mordanting units.

The monomer:

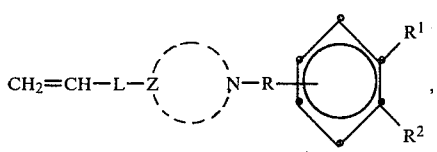

or a polymeric unit derived therefrom, which is polymerized to form the units of the polymer of the invention, can be prepared by quaternizing a compound, monomeric or polymeric, containing one or more pendant tertiary nitrogen-containing heterocyclic groups, such as those specified in the definition of Z above, with a compound of the formula:

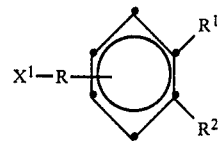

wherein X¹ is selected from the group consisting of epoxy, halo, such as chloro, bromo and iodo; toluenesulfonate; and methanesulfonate.

The quaternization reaction can be carried out under a variety of conditions, but usually is carried out by reacting the reagents in a suitable solvent, e.g., water, methanol or dimethylformamide at elevated temperatures, e.g., up to 100° C. for several hours, e.g., 2 to 24 hours.

The polymer is formed by merely polymerizing the monomer of copolymerizing the monomers in a conventional manner, such as bulk, solution, suspension or emulsion polymerization techniques. Polymerization catalysts, such as 2,2'-azo-bis-(2-methylpropionitrile), 4,4'-azo-bis-(4-eyanovaleric acid) and the like may be used, preferably inconcentrations of from 1 to 5 mole percent and the polymerization can be carried out at temperatures such as 60 to 100° C. and generally at any pressure.

A photographic element in accordance with my invention comprises a support having thereon a layer containing a water-soluble polymer comprising a recurring unit of the formula:

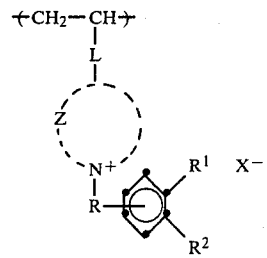

wherein:
L is selected from the group consisting of a single bond and a bivalent linking group;
Z represents the atoms necessary to complete a heterocyclic nucleus;
R is selected from the group consisting of a single bond and alkylene;
X⁻ is an anion; and
R¹ and R² are independently chelating groups, having associated therewith a source of metal ions.

The metal ion source is "associated with" the polymeric layer, which means that the source of metal ions can be in the same layer as the polymer, or in an adjacent layer, so long as the metal ions can react with the chelating groups of the polymer to form a metal complex.

Metal ions useful in this invention are those which are essentially colorless when incorporated into the image-receiving element, react speedily with the released dye or dye-forming material to form a complex of the desired hue, and form a dye complex which is stable to heat, light and chemical reagents. In general, good results are obtained with polyvalent metal ions, such as copper(II), zinc(II), nickel(II), platinum(II), palladium(II) and cobalt(II) ions. Most preferred are the transition metal ions, and especially preferred as nickel(II) and copper(II).

The metal ions which are coordinated to the polymer can be derived from any source of metal ions, such as a solution of a salt of the metal ions in water, or a solvent, such as methanol, ethanol, N,N-dimethylformamide and the like. Preferred sources of metal ions are water-soluble salts, such as water-soluble nickel chloride, sulfate, nitrate, and water-soluble copper chloride, sulfate, nitrate and the like.

The term "coordinate to" as used herein refers to materials which are capable of sharing electron pairs with electophilic, cationic metal atoms. The stability constant for the complex of a polymer and the metal ion is determined by measuring the concentrations of polymer ligand-metal complex, free polymer ligand, and free metal ion at a pH of about 5 or higher, and by applying the equations:

$$M + L = ML \; \beta_1 = \frac{[ML]}{[M][L]}$$

$$M + 2L = ML_2 \; \beta_2 = \frac{[ML_2]}{[M][L]^2}$$

$$M + 3L = ML_3 \; \beta_3 = \frac{[ML_3]}{[M][L]^3}$$

$$\cdot \quad \cdot \quad \cdot$$
$$\cdot \quad \cdot \quad \cdot$$
$$\cdot \quad \cdot \quad \cdot$$

$$M + NL = ML_N \beta_N = \frac{[ML_N]}{[M][L]^N}$$

where M is the concentration of the metal ion, L is the concentration of the polymer ligand, and $\beta$ is the overall stability constant, as described in F. A. Cotton and G. Wilkinson, *Advanced Inorganic Chemistry*, Interscience, New York, 1967. The stability constant for a particular metal ion with a particular polymer containing coordinating groups can be found by quantifying the species mentioned above. In order to be effective, the stability constant of the polymer and metal ion must be at least $10^8$, and preferably from $10^{15}$ to $10^{18}$.

The amount of metal ions used is preferably sufficient to provide each chelating group with about one metal ion.

The polymer may also be useful in a dye image-receiving layer which comprises a support containing thereon a water-soluble polymer comprising a recurring unit of the formula:

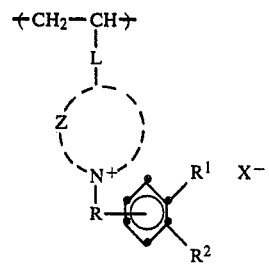

wherein:
L is selected from the group consisting of a single bond and a bivalent linking group;
Z represents the atoms necessary, along with the nitrogen atom, to complete a heterocyclic nucleus;
R is selected from the group consisting of a single bond and alkylene;
$R^1$ and $R^2$ are independently chelating groups; and
$X^-$ is an anion.

The dye image-receiving element can be free of a source of metal ions, or it can contain a source of metal ions associated with the polymeric layer. If the source of metal ions is not present in the element, the element can be used to receive a dye, preferably a chelating dye or dye-forming material, and subsequently be treated with a solution containing a source of metal ions to form a chelate.

The resulting coated support can be used in a variety of photographic elements where a dye image is eventually desired. The photographic element preferably contains a dye or dye-forming material which will, on contact with the metallized polymer, coordinate with the metal and polymer to form a stable dye image.

The dye or dye former can be any conventional dye or dye-forming material, such as those described in U.S. Pat. Nos. 4,013,633; 4,001,204; and 3,954,476. In a preferred embodiment, the dye or dye former is a metal chelating dye or dye former.

Generally, any acid dye or dye-forming material containing the above chelating groups will be useful herein as the metallizable dye or dye forming material. Examples of such dyes are those dye developers described in U.S. Pat. Nos. 3,081,167 and 3,196,014, and British Patent Nos. 905,701 and 1,121,995. Examples of azo dyes useful herein are dihydroxyazo, pyridylhydroxyazo, aminohydroxyazo, pyridylsulfonamidoazo, hydroxyisoquinolazo, and the like.

Dye-forming materials useful in the invention include redox dye releasers containing dye moieties which either contain the chelating groups or can form chelating groups. These dye-forming materials are disclosed in U.S. Pat. No. 4,142,891 issued Mar. 6, 1979, by B. D. Baigrie et al. The nondiffusible compounds having a releasable azo dye moiety generally can have the formula:

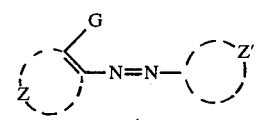

wherein:
Z represents the atoms necessary to complete an aromatic carbocyclic or heterocyclic nucleus having at least one ring of 5 to 7 atoms, such as phenyl, pyridyl, naphthyl, pyrazolyl, indolyl, etc;

Z' is an aromatic carbocyclic or heterocyclic nucleus having at least one ring of 5 to 7 atoms (e.g., the same nuclei as described above for Z), the Z' having, in a position adjacent to the point of attachment to the azo linkage, either:

(a) a nitrogen atom in the ring of the nucleus which acts as a chelating site; or (b) a carbon atom in the ring of the nucleus having directly attached thereto a nitrogen atom, which acts as a chelating site;

G is a metal chelating group (any group which will donate a pair of electrons to a metal ion) or a salt thereof (e.g., an alkali metal salt, a quaternary ammonium slat, etc) or a hydrolyzable precursor thereof (e.g., a hydrolyzable acyl or ester group), e.g., hydroxy; amino; carboxy; sulfonamido; sulfamoyl; a hydrolyzable ester group having the formula $—OCOR^{10}$, $—OCOOR^{10}$, $—OCON(R^{10})_2$ or $—COOR^{10}$, wherein $R^{10}$ is an alkyl group having 1 to about 4 carbon atoms, such as methyl, ethyl, isopropyl, butyl and the like, or an aryl group having 6 to about 8 carbon atoms, such as phenyl, etc; or a group which together with

is a ballasted carrier moiety (as defined below) which is attached to the Z-nucleus through the oxygen of the

group; the compound containing a ballasted carrier moiety capable of releasing the diffusible azo dye, under alkaline conditions, such as, for example, as a function (either direct or inverse) of development of the silver halide emulsion layer.

In the above formula, G can be either a monovalent group or a nitrogen atom as part of a heterocyclic ring fused to Z. In this later instance, the Z and G atoms can form a nucleus which is the same as the Z' nucleus.

There is a great latitude in selecting a carrier moiety which is attached to the azo dye-releasing compounds described above. Depending upon the nature of the ballasted carrier selected, various groups may be needed to attach or link the carrier moiety to the azo dye. Such linking groups are considered to be a part of the CAR moiety in the definition below. It should also be noted that when the dye moiety is released from the compound, cleavage may take place in such a position that part or all of a linking group if one is present, and even part of the ballasted moiety may be transferred to the image-receiving layer along with the dye moiety. In any event, the azo dye nucleus, as shown above, can be thought of as the "minimum" which is transferred.

CAR moieties useful herein are described in U.S. Pat. Nos. 3,227,550; 3,628,952; 3,227,552; and 3,844,785 (dye released by chromogenic coupling); U.S. Pat. Nos. 3,443,939 and 3,443,940 (dye released by intramolecular ring closure); U.S. Pat. Nos. 3,698,897 and 3,725,062 (dye released from hydroquinone derivatives); U.S. Pat. No. 3,728,113 (dye released from a hydroquinonylmethyl quaternary salt); U.S. Pat. Nos. 3,719,489 and 3,443,941 (silver ion induced dye release); and U.S. Pat. Nos. 3,245,789 and 3,980,497; Canadian Patent No. 602,607; British Patent No. 1,464,104; *Research Disclosure* 14447, April 1976; and U.S. Pat. No. 4,139,379 issued Feb. 13, 1979 of Chasman et al (dye released by miscellaneous mechanisms).

In a further preferred embodiment, the ballasted carrier moiety or CAR as described below may be represented by the following formula:

(Ballast-Carrier-Link)- wherein:

(a) Ballast is an organic ballasting radical of such molecular size and configuration as to render the compound nondiffusible in a photographic element during development in an alkaline processing composition;

(b) Carrier (CAR) is an oxidizable acyclic, carbocyclic or heterocyclic moiety (see "The Theory of the Photographic Process", by C. E. K. Mees and T. H. James, Third Edition, 1966, pages 282 to 283), e.g., moieties containing atoms according to the following configuration:

wherein:

b is a positive integer of 1 to 2; and a represents the radicals OH, SH, NH—, or hydrolyzable precursors thereof; and (c) Link represents a group which upon oxidation of said Carrier moiety is capable of being hydrolytically cleaved to release the diffusible azo dye. For example, Link may be the following groups:

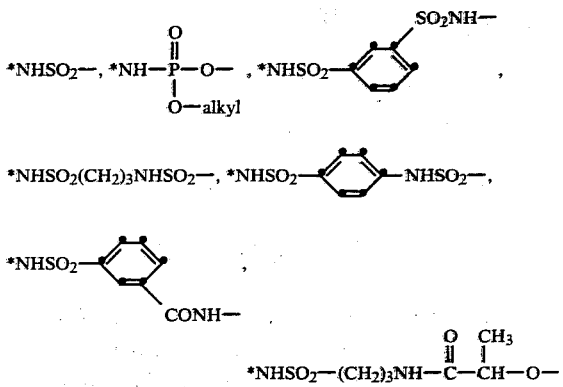

wherein * represents the position of attachment to Carrier.

The Ballast group in the above formula is not critical as long as it confers nondiffusibility to the compound. Typical Ballast groups include long-chain alkyl radicals linked directly or indirectly to the compound as well as aromatic radicals of the benzene and naphthalene series indirectly attached or fused directly to the carbocyclic or heterocyclic nucleus, etc. Useful Ballast groups generally have at least 8 carbon atoms such as substituted or unsubstituted alkyl groups of 8 to 22 carbon atoms, a carbamoyl radical having 8 to 30 carbon atoms such as $—CONH(CH_2)_4—O—C_6H_3(C_5H_{11})_2$, $—CON(C_{12}H_{25})_2$, etc., a keto radical having 8 to 30 carbon atoms such as $—CO—C_{17}H_{35}$, $—CO—C_6H_4(t-C_{12}H_{25})$, etc.

For specific examples of Ballast-Carrier-Link moieties useful as the CAR moiety, reference is made to the November 1976 edition of *Research Disclosure*, pages 68 through 74, and the April 1977 edition of *Research Disclosure*, pages 32 through 39, the disclosures of which are hereby incorporated by reference.

The ballasted carrier moiety or CAR can also be a group having the formula:

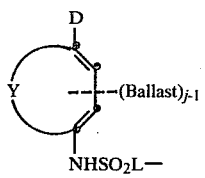

wherein:
- (a) Ballast is an organic ballasting radical of such molecular size and configuration (e.g., simple organic groups or polymeric groups) as to render the compound nondiffusible in a photographic element during development in an alkaline processing composition;
- (b) D is $OR^{11}$ or $NHR^{12}$ wherein $R^{11}$ is hydrogen or a hydrolyzable moiety and $R^{12}$ is hydrogen or a substituted or unsubstituted alkyl group of 1 to 22 carbon atoms such as methyl, ethyl, hydroxyethyl, propyl, butyl, secondary butyl, tert-butyl, cyclopropyl, 4-chlorobutyl, cyclobutyl, 4-nitroamyl, hexyl, cyclohexyl, octyl, decyl, octadecyl, dodecyl, benzyl, phenethyl, etc. (when $R^{12}$ is an alkyl group of greater than 8 carbon atoms, it can serve as a partial or sole Ballast);
- (c) Y represents the atoms necessary to complete a benzene nucleus, a naphthalene nucleus, or a 5- to 7-membered heterocyclic ring, such as pyrazolone, pyrimidine, etc;
- (d) j is a positive integer of 1 to 2 and is 2 when D is $OR^{11}$ or when $R^{12}$ is hydrogen or an alkyl group of less than 8 carbon atoms; and
- (e) L is a linking group which is $[X-(NR^{13}-J)_q]_m-$ or $X-J-NR^{13}-$ wherein:
  - (i) X represents a bivalent linking group of the formula $-R^{14}-L'_n-R^{14}_p-$ where each $R^{14}$ can be the same or different and each represents an alkylene radical having 1 to about 8 carbon atoms, such as methylene, hexylene and the like; a phenylene radical; or a substituted phenylene radical having 6 to about 9 carbon atoms, such as methoxy phenylene;
  - (ii) L' represents a bivalent radical selected from oxy, carbonyl, carboxamido, carbamoyl, sulfonamido, ureylene, sulfamoyl, sulfinyl or sulfonyl;
  - (iii) n is an integer of 0 or 1;
  - (iv) p is 1 when n equals 1 and p is 1 or 0 when n equals 0, provided that when p is 1 the carbon content of the sum of both $R^{14}$ radicals does not exceed 14 carbon atoms;
  - (v) $R^{13}$ represents a hydrogen atom, or an alkyl radical having 1 to about 6 carbon atoms;
  - (vi) J represents a bivalent radical selected from sulfonyl or carbonyl;
  - (vii) q represents an integer of 0 or 1; and
  - (viii) m represents an integer of 0, 1 or 2.

Especially good results are obtained in the above formula when D is OH, j is 2, Y is a naphthalene nucleus, and G is OH.

Examples of the CAR moiety in this highly preferred embodiment are disclosed in U.S. Published Patent Application No. B351,673; U.S. Pat. No. 3,928,312; French Patent No. 2,284,140; and German Patent Nos. 2,406,664; 2,613,005; and 2,505,248, the disclosures of which are hereby incorporated by reference, and include the following:

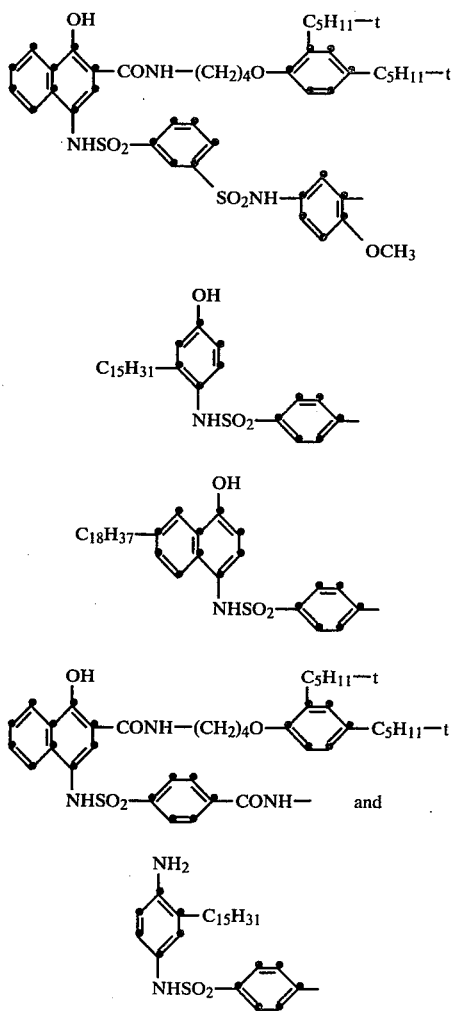

In another highly preferred embodiment, the ballasted carrier moiety or CAR is such that the diffusible azo dye is released as an inverse function of development of the silver halide emulsion layer under alkaline conditions. This is ordinarily referred to as positive-working dye-release chemistry. In one of these embodiments, the ballasted carrier moiety or CAR in the above formulas may be a group having the formula:

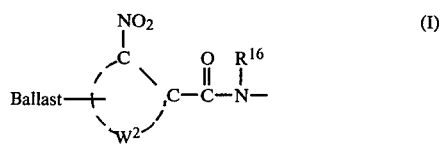

(I)

wherein:
Ballast is an organic ballasting radical of such molecular size and configuration as to render the compound nondiffusible in a photographic element during development in an alkaline processing composition;

$W^2$ represents at least the atoms necessary to complete a benzene nucleus (including various substituents thereon); and $R^{16}$ is an alkyl (including substituted alkyl) radical having 1 to about 4 carbon atoms.

Examples of the CAR moiety in this formula I include the following:

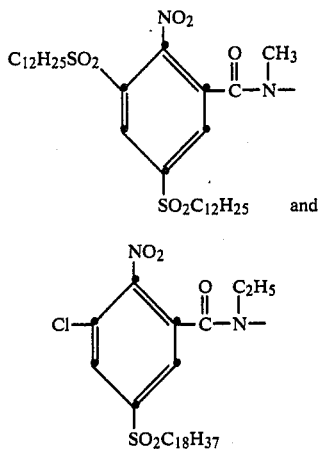

In a second embodiment of positive-working dye-release chemistry as referred to above, the ballasted carrier moiety or CAR may be a group having the formula:

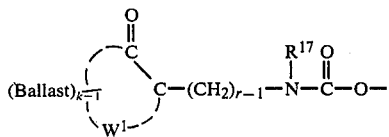

(II)

wherein:
Ballast is an organic ballasting radical of such molecular size and configuration as to render the compound nondiffusible in a photographic element during development in an alkaline processing composition;

$W^1$ represents at least the atoms necessary to complete a quinone nucleus (including various substituents thereon);

r is a positive integer of 1 or 2;

$R^{17}$ is an alkyl (including substituted alkyl) radical having 1 to about 40 carbon atoms or an aryl (including substituted aryl) radical having 6 to about 40 carbon atoms; and k is a positive integer of 1 to 2 and is 2 when $R^{17}$ is a radical of less than 8 carbon atoms.

Examples of the CAR moiety in formula II include the following:

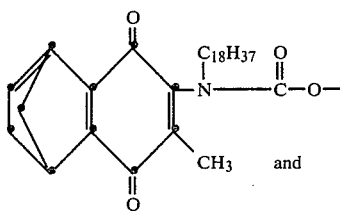

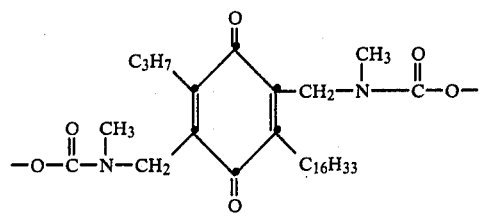

In using the compounds in formulas I and II above, they are employed in a photographic element similar to the other nondiffusible dye-releasers described previously. Upon reduction of the compound as a function of silver halide development under alkaline conditions, the metallizable azo dye is released. In this embodiment, conventional negative-working silver halide emulsions, as well as direct-positive emulsions, can be employed. For further details concerning these particular CAR moieties, including synthesis details, reference is made to U.S. Pat. No. 4,139,379 of Chasman et al, issued Feb. 13, 1979.

In a third embodiment of positive-working dye-release chemistry as referred to above, the ballasted carrier moiety or CAR may be a group having the formula:

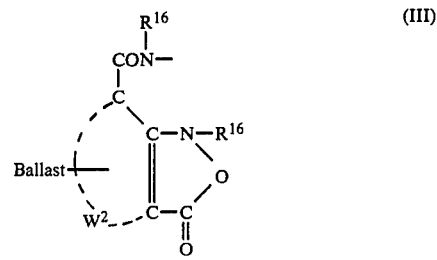

(III)

wherein: Ballast, $W^2$ and $R^{16}$ are as defined for formula I above.

Examples of the CAR moiety in formula III include the following:

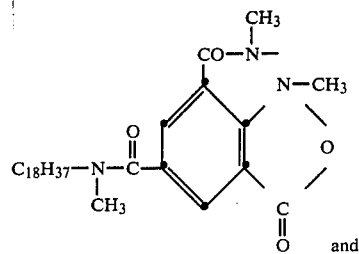

and

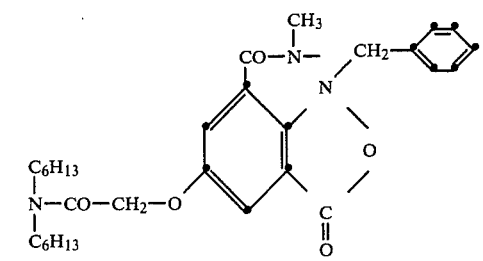

For further details concerning this particular CAR moiety including synthesis details, reference is made to U.S. Pat. No. 4,199,354 of Hinshaw et al, issued Apr. 22, 1980.

In a fourth embodiment of positive-working dye-release chemistry as referred to above, the ballasted carrier moiety or CAR may be a group having the formula:

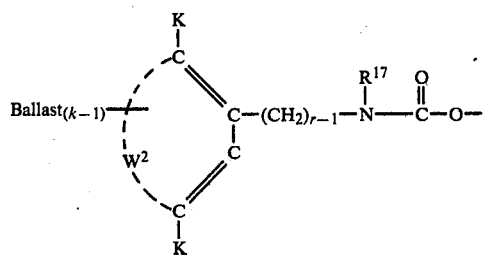

(IV)

wherein:
Ballast, r, $R^{17}$ and k are as defined for formula II above;
$W^2$ is as defined for formula I above; and
K is OH or a hydrolyzable precursor thereof.
Examples of the CAR moiety in formula IV include the following:

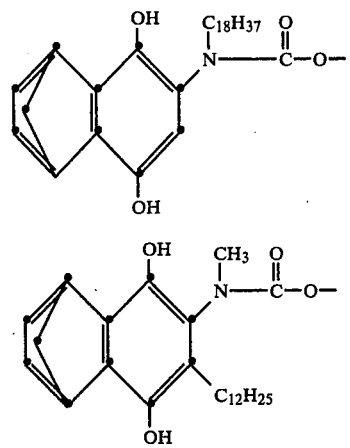

For further details concerning this particular CAR moiety, including synthesis details, reference is made to U.S. Pat. No. 3,980,479 of Fields et al, issued Sept. 14, 1976, the disclosure of which is hereby incorporated by reference.

Representative dye-releasing compounds useful with the polymers of our invention include the following:

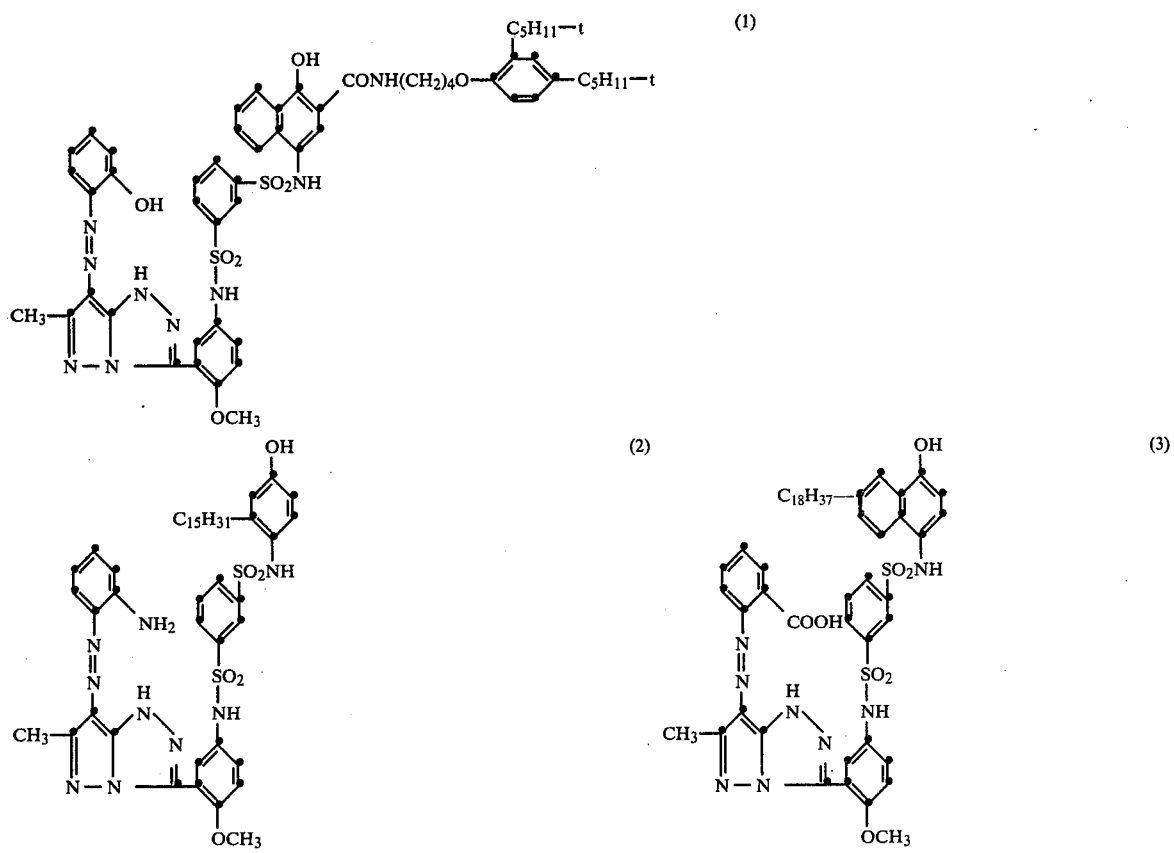

-continued
(4)
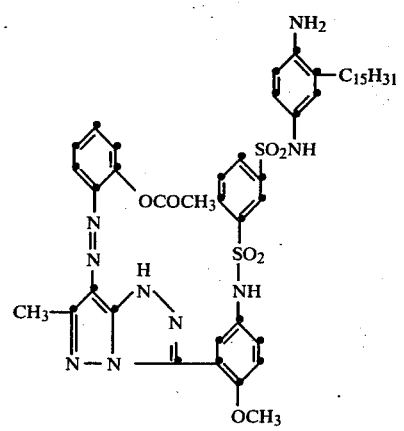
(5)
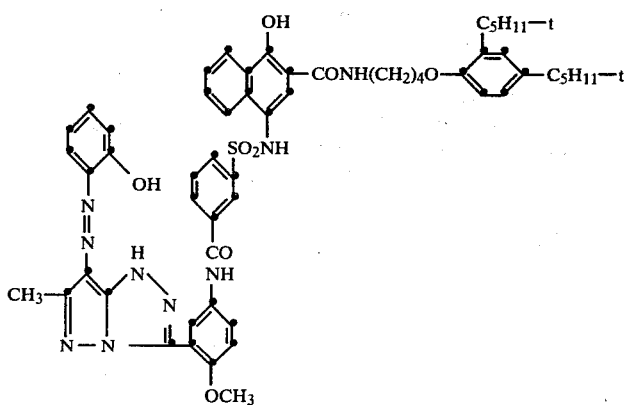
(6)
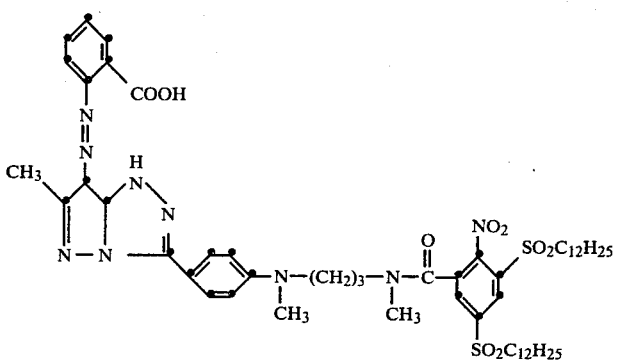
(7)
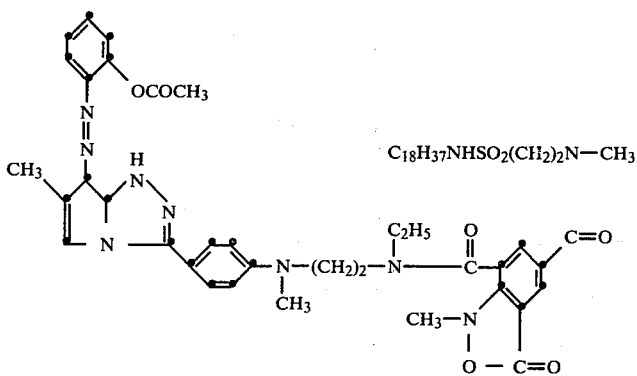

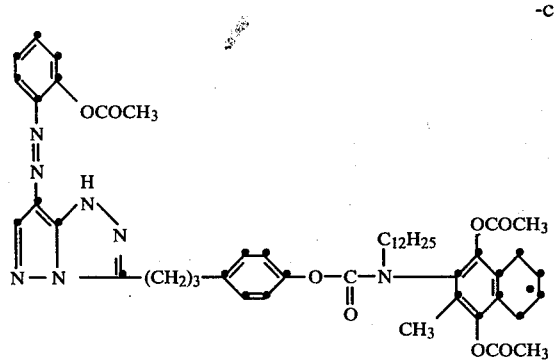
(8)
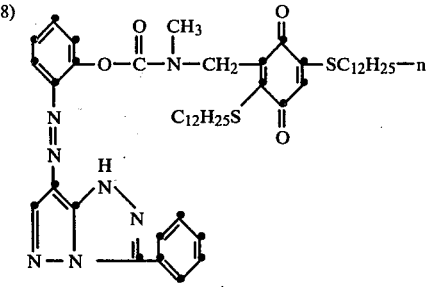
(9)
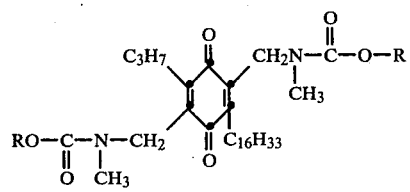
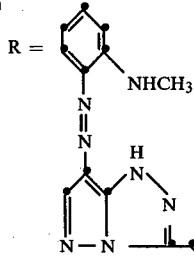
(10)
(11)
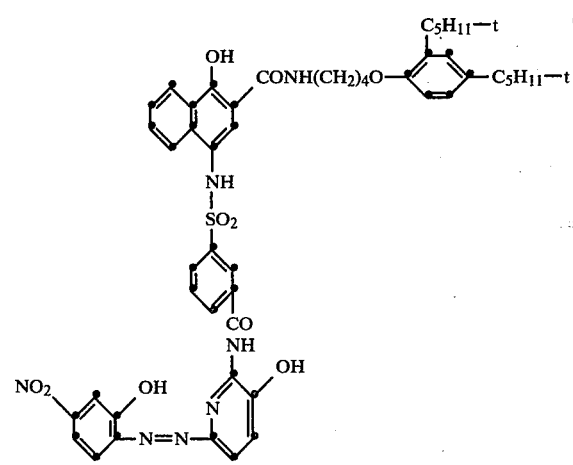
(12)
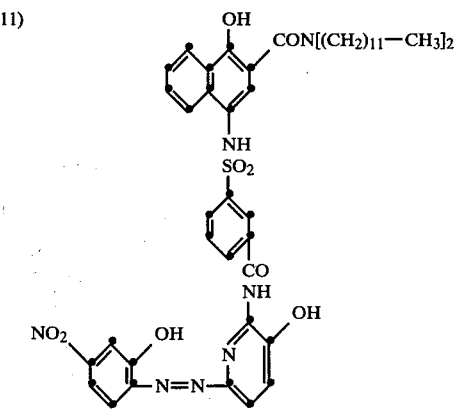
(13)
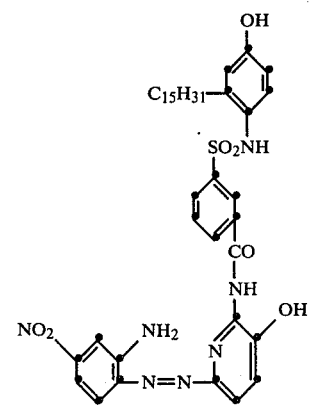
(14)
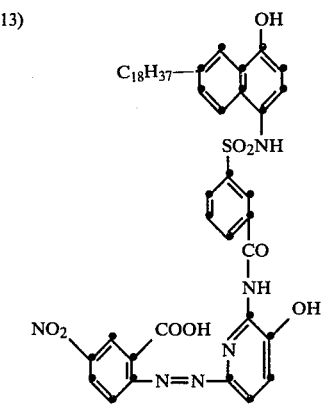
(15)
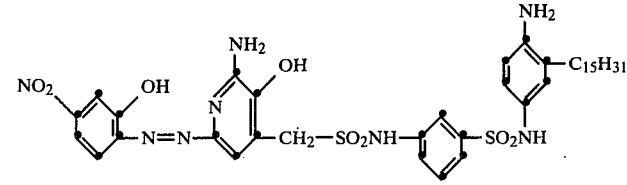

-continued
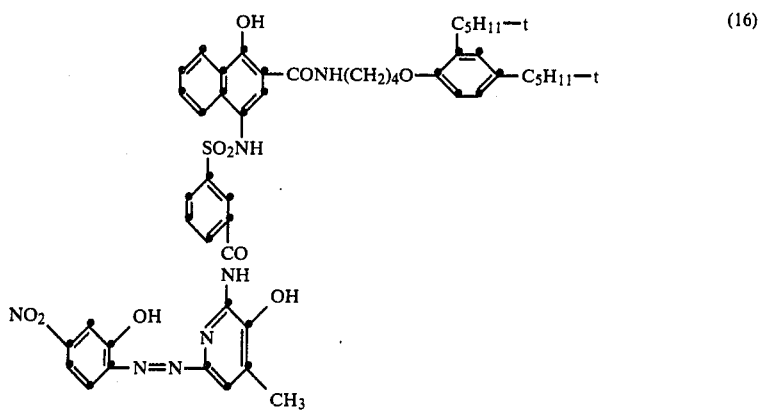 (16)
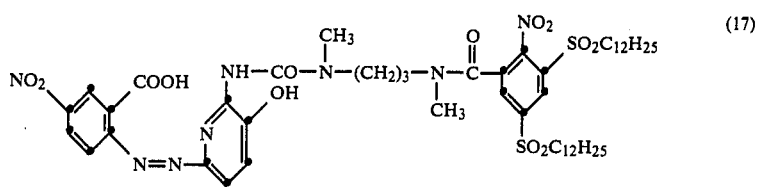 (17)
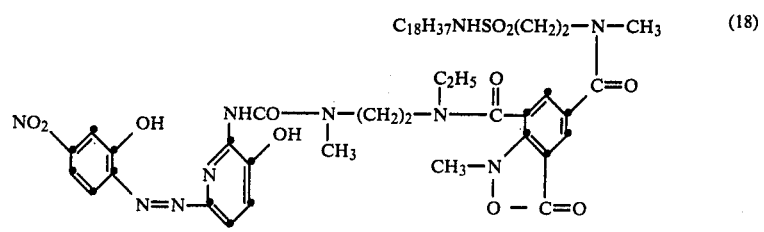 (18)
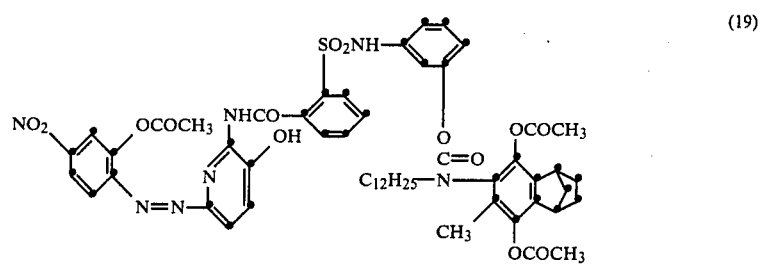 (19)
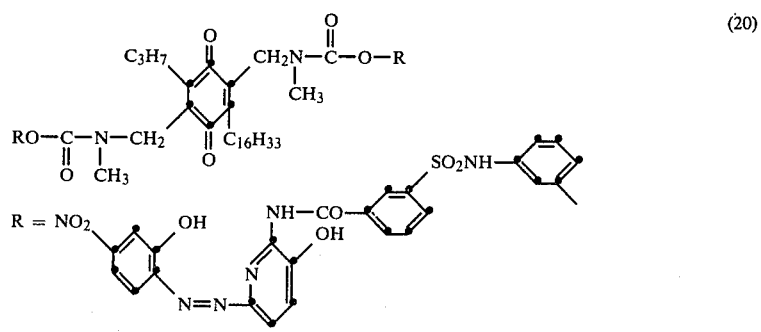 (20)

-continued

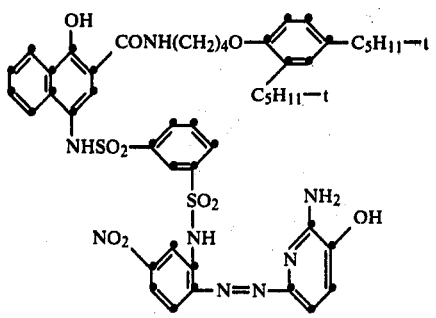 (21)

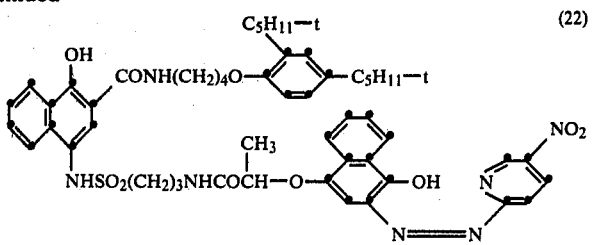 (22)

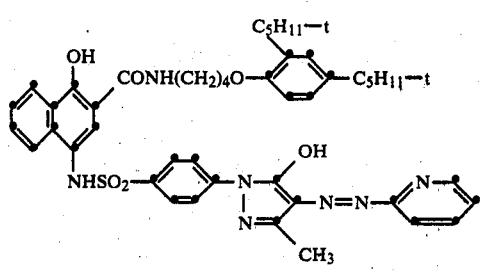 (23)

(24)

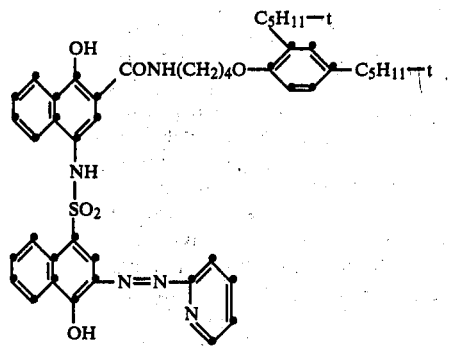 (25)

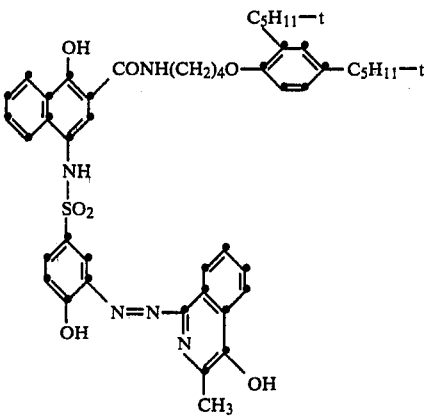 (26)

In a preferred embodiment, the photographic element containing the mordant layer, polymer with coordinating groups and metal ions is a dye image receiving element designed for use in an image transfer process.

An image transfer film unit of the invention can thus comprise:

(1) a support having thereon at least one layer containing a photosensitive silver halide emulsion having associated therewith a dye or dye forming material, preferably a chelating dye or dye forming material;
(2) a dye image receiving layer; and
(3) an alkaline processing composition and means for discharging the same within said film unit in contact with said photosensitive layer;

said film unit containing a silver halide developing agent, wherein the dye image-receiving layer contains a water-soluble polymer comprising a recurring unit of the formula:

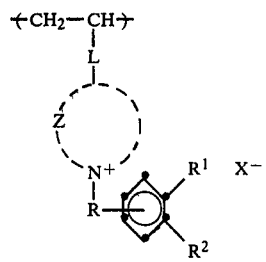

wherein:
L is selected from the group consisting of a single bond and a bivalent linking group;
Z represents the atoms necessary, along with the nitrogen atom, to complete a heterocyclic nucleus;
R is selected from the group consisting of a single bond and alkylene;
$X^-$ is an anion; and
$R^1$ and $R^2$ are independently chelating groups, said dye image-receiving layer having associated therewith a source of metal ions.

The photographic element in the above-described film unit can be treated with an alkaline processing composition to effect or initiate development in any manner. A preferred method for applying processing composition is by use of a rupturable container or pod which contains the composition. In general, the processing composition employed in this invention contains the developing agent for development, although the composition could also just be an alkaline solution where the developer is incorporated in the photographic element, image-receiving element or process sheet, in which case the alkaline solution serves to activate the incorporated developer.

A photographic film unit which can be processed in accordance with this invention is adapted to be processed by passing the unit between a pair of juxtaposed pressure-applying members, such as would be found in a camera designed for in-camera processing, and comprises:

(1) a photographic element as described above;
(2) a dye image-receiving layer; and
(3) means for discharging an alkaline processing composition within the film unit, such as a rupturable container which is adapted to be positioned during processing of the film unit so that a compressive force applied to the container by the pressure-applying members will effect a discharge of the container's contents within the film unit;

the film unit containing a silver halide developing agent.

It will be appreciated that, after processing the photographic element described above, there remains in it after transfer has taken place an imagewise distribution of chelating dye in addition to developed silver. A color image comprising residual nondiffusible compound may be obtained in this element if the residual silver and silver halide are removed by any conventional manner well known to those skilled in the photographic art, such as a bleach bath followed by a fix bath, a bleach-fix bath, etc. Such a retained dye image should normally be treated with metal ions to metallize the dyes to increase their light fastness and shift their spectral absorption to the intended region. The imagewise distribution of azo dye may also diffuse out of the element into these baths, if desired, rather than to an image-receiving element. If a negative-working silver halide emulsion is employed in certain preferred photosensitive elements, described above, then a positive color image, such as a reflection print, a color transparency or motion picture film, may be produced in this manner. If a direct-positive silver halide emulsion is employed in such photosensitive elements, then a negative color image may be produced.

In the embodiment described above, the dye image-receiving layer may itself contain metal ions or the metal ions may be present in an adjacent layer, so that the dye or dye forming material which is released will form a coordination complex therewith. The dye thus becomes immobilized in the dye image-receiving layer and metallized at the same time. The formation of the coordination complex may shift the absorption of the dye to the desired hue, usually to longer wavelengths, which have a different absorption than that of the initial dye-releasing compound. If this shift is large enough, then the dye-releasing compound may be incorporated in a silver halide emulsion layer without adversely affecting its sensitivity.

The polymer and metal ions in the receiving layer form a metallized polymer comprising a recurring unit of the formula:

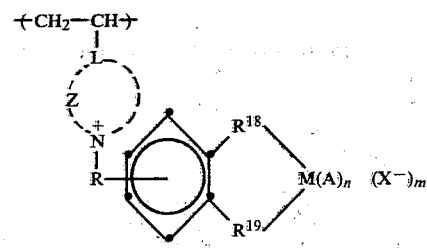

wherein:
$R^{18}$ and $R^{19}$ are the same as or derived from $R^1$ and $R^2$, respectively;
n is an integer of 1 to 4;
A is a mono- or multidentate ligand;
M is a metal;
Z represents the atoms necessary to complete a heterocyclic nucleus;
L is selected from the group consisting of a single bond and a bivalent linking group;
R is selected from the group consisting of a single bond and alkylene;
$X^-$ is an anion; and
m is 0 or an integer;

The dye image-receiving layer in the above-described film unit can be located on a separate support adapted to be superposed on the photographic element after exposure thereof. Such image-receiving elements are generally disclosed, for example, in U.S. Pat. No. 3,362,819. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the above-described film unit can also be located integral with the photographic element between the support and the lowermost photosensitive silver halide emulsion layer. One useful format for integral receiver-negative photographic elements is disclosed in Belgian Patent No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer and dye images are formed as a function of development which diffuse to the image-receiving layer to provide a positive, right-reading image which is viewed through the transparent support on the opaque reflecting layer background. For other details concerning the format of this particular integral film unit, reference is made to the above-mentioned Belgian Patent No. 757,960.

Another format for integral negative-receiver photographic elements in which the present invention can be employed is disclosed in Belgian Patent No. 757,959. In this embodiment, the support for the photographic element is transparent and is coated with the image-receiving layer, a substantially opaque, light-reflective layer and the photosensitive layer or layers described above. A rupturable container containing an alkaline processing composition and an opacifier is positioned adjacent the top layer and a transparent top sheet which has thereon a neutralizing layer and a timing layer. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development which diffuse to the image-receiving layer to provide a positive, right-reading image which is viewed through the transparent support on the opaque reflecting layer background. For further details concerning the format of this particular integral film unit, reference is made to the above-mentioned Belgian Patent. No. 757,959.

Still other useful integral formats in which this invention can be employed are described in U.S. Pat. Nos. 3,415,644; 3,415,645; 3,415,646; 3,647,437; and 3,635,707. In most of these formats, a photosensitive silver halide emulsion is coated on an opaque support and a dye image-receiving layer is located on a separate transparent support superposed over the layer outermost from the opaque support. In addition, this transparent support also preferably contains a neutralizing layer and a timing layer underneath the dye image-receiving layer.

Another embodiment of the invention uses the image-reversing technique disclosed in British Patent No. 904,364, page 19, lines 1 through 41. In this process, the dye-releasing compounds are used in combination with physical development nuclei in a nuclei layer contiguous to the photo-sensitive silver halide negative emulsion layer. The film unit contains a layer halide solvent, preferably in a rupturable container with the alkaline processing composition.

The film unit or assembly used in the present invention may be used to produce positive images in single- or multicolors. In a preferred three-color system, each silver halide emulsion layer of the film assembly will have associated therewith a dye-releasing compound which releases a dye processing a predominant spectral absorption within the region of the visible spectrum to which said silver halide emulsion is sensitive (initially or after forming the coordination complex), i.e., the blue-sensitive silver halide emulsion layer will have a yellow dye-releaser associated therewith, the green-sensitive silver halide emulsion layer will have a magenta dye-releaser associated therewith, and the red-sensitive silver halide emulsion layer will have a cyan dye-releaser associated therewith, at least one of the dye-releasers being a compound in accordance with the present invention. The dye-releaser associated with each silver halide emulsion layer may be contained either in the silver halide emulsion layer itself, or in a layer contiguous to the silver halide emulsion layer.

The concentration of dye or dye-forming compounds that can be employed in the present invention may be varied over a wide range, depending upon the particular compound employed and the results which are desired. For example, dye or dye-forming compounds may be coated in layers by using coating solutions containing between about 0.5 and about 8 percent by weight of the dye or dye-forming compounds distributed in a hydrophilic film-forming natural material or synthetic polymer, such as gelatin, poly(vinyl alcohol), etc, which is adapted to be permeated by aqueous alkaline processing composition.

Depending upon which CAR is used in the dye-releasing compound, a variety of silver halide developing agents can be employed. In certain embodiments of the invention, any silver halide developing agent can be employed as long as it cross-oxidizes with the dye-releasers described herein. The developer may be employed in the photosensitive element to be activated by the alkaline processing composition. Specific examples of developers which can be employed in this invention include:

N-methylaminophenol
Phenidone (1-phenyl-3-pyrazolidone)
Dimezone (1-phenyl-4,4-dimethyl-3-pyrazolidone)
aminophenols
1-phenyl-4-methyl-4-hydroxymethyl-3-pyrazolidone
N,N-diethyl-p-phenylenediamine
N,N,N',N'-tetramethyl-p-phenylenediamine
3-methyl-N,N-diethyl-p-phenylenediamine
3-methoxy-N-ethyl-N-ethoxy-p-phenylenediamine, etc.
The non-chromogenic developers in this list are preferred, however, since they avoid any propensity of staining the dye image-receiving layer.

In one of the preferred embodiments of the invention, the silver halide developer employed in the process becomes oxidized upon development and reduces silver halide to silver metal. The oxidized developer then cross-oxidizes the dye-releasing compound. The product of cross-oxidation then undergoes alkaline hydrolysis, thus releasing an imagewise distribution of diffusible azo dye which then diffuses to the receiving layer to provide the dye image. The diffusible moiety is transferrable in alkaline processing composition either by virtue of its self-diffusivity or by having attached to it one or more solubilizing groups, for example, a carboxy, sulpho, sulphonamido, hydroxy or morpholino group.

In using dye-releasing compounds which produce diffusible dye images as a function of development, either conventional negative-working or direct-positive layer halide emulsions may be employed. If the silver halide emulsion employed is a direct-positive silver halide emulsion, such as an internal-image emulsion designed for use in the internal image reversal process or a fogged, direct-positive emulsion such as a solarizing emulsion, which is developable in unexposed areas, a positive image can be obtained in certain embodiments on the dye image-receiving layer. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a pH-lowering layer in the film unit or image-receiving unit lowers the pH of the film unit or image receiver to stabilize the image.

Internal-image silver halide emulsions useful in this invention are described more fully in the November 1976 edition of *Research Disclosure*, pages 76 through 79, the disclosure of which is hereby incorporated by reference.

The various silver halide emulsion layers of a color film assembly employed in this invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that may be transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention can be of the type disclosed in U.S. Pat. Nos. 2,543,181; 2,643,886; 2,653,732; 2,723,051; 3,056,492; 3,056,491; and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye or dye-forming compounds are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure*, the disclosure of which is hereby incorporated by reference.

Use of a pH-lowering material in the film units employed in this invention will usually increase the stability of the transferred image. Generally, the pH-lowering material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure* and pages 35 through 37 of the July 1975 edition of *Research Disclosure*, the disclosures of which are hereby incorporated by reference.

A timing or inert spacer layer can be employed in the practice of this invention over the pH-lowering layer which "times" or controls the pH reduction as a function of the rate at which alkali diffuses through the inert spacer layer. Examples of such timing layers and their functioning are disclosed in the *Research Disclosure* articles mentioned in the paragraph above concerning pH-lowering layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably processing a pH in excess of 11, and preferably containing a developing agent as described previously. Suitable materials and addenda frequently added to such compositions are disclosed on pages 79 and 80 of the November 1976 edition of *Research Disclosure*, the disclosure of which is hereby incorporated by reference.

While the alkaline processing composition used in this invention can be employed in a rupturable container, as described previously, to conveniently facilitate the introduction of processing composition into the film unit, other methods of inserting processing composition into the film unit could also be employed, e.g., interjecting processing solution with communicating members similar to hypodermic syringes which are attached either to a camera or camera cartridge. The processing composition may also be applied by means of a swab or by dipping in a bath, if so desired.

The alkaline solution-permeable, substantially opaque, light-reflective layer employed in certain embodiments of photographic film units used in this invention are described more fully in the November 1976 edition of *Research Disclosure*, page 82, the disclosure of which is hereby incorporated by reference.

The supports for the photographic elements used in this invention can be any material as long as it does not deleteriously affect the photographic properties of the film unit and is dimensionally stable. Typical flexible sheet materials are described on page 85 of the November 1976 edition of *Research Disclosure*, the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone.

The silver halide emulsions useful in this invention, both negative-working and direct-positive ones, are well known to those skilled in the art and are described in *Product Licensing Index*, Volume 92, December 1971, publication 9232, page 107, paragraph I, "Emulsion types"; they may be chemically and spectrally sensitized as described on page 107, paragraph III, "Chemical sensitization", and pages 108 and 109, paragraph XV, "Spectral sensitization", of the above article; they can be protected against the production of fog and can be stabilized against loss of sensitivity during keeping by employing the materials described on page 107, paragraph V, "Antifoggants and stabilizers", of the above article; they can contain development modifiers, hardeners, and coating aids as described on pages 107 and 108, paragraph IV, "Development modifiers"; paragraph VII, "Hardeners"; and paragraph XII, "Coating aids", of the above article; they and other layers in the photographic elements used in this invention can contain plasticizers, vehicles and filter dyes described on page 108, paragraph XI, "Plasticizers and lubricants", and paragraph VIII, "Vehicles", and page 109, paragraph XVI, "Absorbing and filter dyes", of the above article; they and other layers in the photographic elements used in this invention may contain addenda which are incorporated by using the procedures described on page 109, paragraph XVII, "Methods of addition", of the above article; and they can be coated by using the various techniques described on page 109, paragraph XVIII, "Coating procedures", of the above article, the disclosures of which are hereby incorporated by reference.

The term "nondiffusing" as used herein has the meaning commonly applied to the term in photography and denotes materials that, for all practical purposes, do not migrate nor wander through organic colloid layers, such as gelatin, in an alkaline medium, in the photographic elements of the invention and preferably when processed in a medium having a pH of 11 or greater. The same meaning is to be attached to the term "immobile". The term "diffusible", as applied to the materials of this invention, has the converse meaning and denotes materials having the property of diffusing effectively through the colloid layers of the photographic elements in an alkaline medium in the presence of "nondiffusing" materials. "Mobile" has the same meaning.

In the preferred embodiment, the film unit is an integral film unit wherein the receiver, dye-forming layer and cover sheet are permanently attached to one another before, during and after processing.

The resulting mordant layer in the image transfer film unit comprises metal ions chelated to the polymer and to the dye or dye-forming material.

The following examples are presented for a further understanding of the invention.

EXAMPLE 1

Poly{(1-vinylimidazole)-co-(1-vinyl-3-benzylimidazolium chloride)-co-[1-vinyl-3-(3-aceto-4-hydroxybenzyl-)imidazolium chloride]}

Poly(1-vinylimidazole) ($10^{-1}$ mole, 9.4 g) was dissolved in methanol (400 ml) and reacted with 3-aceto-4-hydroxybenzyl chloride ($2.5 \times 10^{-2}$ mole, 4.6 g) for 6 hours at the reflux temperature of the mixture. Benzyl chloride ($7.5 \times 10^{-2}$ mole, 9.5 g) was then added and the reaction mixture was left refluxing for another two days. The solvent was evaporated down to about 200 ml and the mixture was precipitated into ethyl acetate. The solid was filtered off and dried under vacuum to give about 16 g of a slightly yellow solid.

Preparation of 3-formyl-4-hydroxybenzyl chloride and 3-aceto-4-hydroxybenzyl chloride The compound was prepared by a modified procedure of Stoermer and Behn (R. Stoermer and K. Behn, Ber., 34 [1901], 2455). A 500-ml, three-neck flask equipped with a stirrer, thermometer and a gas inlet was charged with salicylaldehyde (61 g), formaldehyde (40 percent aqueous solution, 41 g) and hydrochloric acid (32 weight percent, 60 g). HCl gas was passed into the reaction mixture for 20 hours while the temperature was maintained below 30° C. The resulting dark purple reaction mixture was then treated with hot water (3×200 ml) to remove the unreacted paraformaldehyde. The crude product was sublimed at 100°/1 mm to give 34 g of white 3-formyl-4-hydroxybenzyl chloride (40 percent yield in salicylaldehyde), m.p. 90° C.

$C_8H_7ClO_2$ requires (percent): C, 56.31; H, 4.14; Cl, 20.82; Found: C, 56.33; H, 4.17; Cl, 20.85

Similarly, 3-acetyl-4-hydroxybenzyl chloride was prepared by chloromethylating o-hydroxyacetophenone, $C_9H_9ClO_2$ requires (percent): C, 58.60; H, 4,93; Cl, 19.20; Found: C, 58.52; H, 4.94; Cl, 19.40

EXAMPLE 2

Poly{(1-vinylimidazole)-co-(1-vinyl-3-benzylimidazolium chloride)-co-[1-vinyl-3-(3-aceto-4-hydroxybenzyl copper (II) ethylenediamine)-imidazolium chloride]}

Poly(1-vinylimidazole)-co-(1-vinyl-3-benzylimidazolium chloride)-co-[1-vinyl-3-(3-aceto-4-hydroxybenzyl)-imidazolium chloride] (9.4 g) was dissolved in water (800 ml) and copper (II) ethylenediamine chloride (3 g) in water (100 ml) was added dropwise. The mixture was left stirring for 30 minutes and then "diafiltered" using a UM2 "Diaflo" membrane at 50 psi. The residue was freeze-dried to give about 12 g of the final product. "Diaflo" is a trademark of the Amicon Corporation.

Preparation of ethylenediamine copper (II) chloride $CuCl_2.2H_2O$ (17 g) was dissolved in water (100 ml) and ethylenediamine (6 g) was added dropwise. The reaction mixture was poured into acetone (500 ml) and the resulting precipitate was filtered off and dried to give a light blue powder (19 g).

$C_2H_8Cl_2CuN_2$ requires (percent): C, 12.34; H, 4.16; Cl, 36.40; N, 14.40; Cu, 32.60; Found: C 12.18; H, 4.06; Cl, 35.25; N, 14.46; Cu, 31.30

EXAMPLE 3

The metallized polymer of Example 2 (1.39 g) was dissolved in demineralized water (39.75 ml), 10 percent aqueous gelatin (6.25 ml), 10 percent aqueous p-nonylphenoxypolyglycidol (1.5 ml) and 30 percent methanolic 1,4-butanediol diglycidyl ether (2.5 ml) were added. The mixture was coated onto 0.007-inch thick subbed poly(ethylene terephthalate) transparent film base. During coating, the coating support was held horizontally on a flat bed, and the coating mixture was spread over the support using a 0.009-inch undercut blade, giving a coating laydown of about 1.2 ml/square meter.

Coatings were hardened at 46° C. for 7 days.

EXAMPLE 4

Strips of the coating of Example 3 were dyed by dipping into a 0.1 weight percent solution of 3-(2-hydroxy-1-naphthylazo)-4-hydroxybenzenesulphonamide dye in 0.1 N NaOH. The strips were left in the solution for about 2 minutes to give a maximum dye optical density of about 2. The strips were then washed with demineralized water and dried at room temperature.

Sample strips of the coating were also dyed by laminating to coatings of the above dye in gelatin (prepared as described below using a thickened alkaline processing solution (40 g/l NaOH, 28 g/l hydroxyethylcellulose). The laminates were peeled apart after 5 minutes and the separated layers washed in demineralized water and dried.

The light stability of the above dyed strips was considerably improved, compared with similar control strips containing unmetallized mordant.

The dye in gelatin was coated to give a dye laydown of 2.5 mg/square meter. The dye dispersion was prepared by mixing a solution of the dye (1 g) in cyclohexanone (25 ml) and dimethylformamide (10 ml) with a 4.2 percent aqueous gelatin solution (378 g) containing the surfactant isopropylnaphthalenesulphonate (1 g). The mixture was agitated ultrasonically and finally diluted with water to 400 ml.

The invention has been described in detail with particular reference to preferred embodiments thereof, but it will be understood that variations and modifications can be effected within the spirit and scope of the invention.

What is claimed is:

1. A water-soluble polymer comprising a recurring unit of the formula:

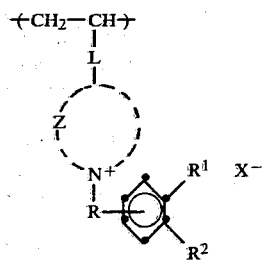

wherein:
L is selected from the group consisting of a single bond and a bivalent linking group;
Z represents the atoms necessary to complete a heterocyclic nucleus;
R is selected from the group consisting of a single bond and alkylene;
$R^1$ is selected from the group consisting of OH, COOH, $NHR^4$, $NHCOR^3$, $NHSO_2R^5$, $C(R^4)=O$, $C(R^4)=NR^5$ and $SO_2NHR^4$; and $R^2$ is selected from the group consisting of COOH, $C(R^4)=O$, $C(R^4)=NR^5$ and $SO_2NHR^4$; wherein $R^3$ is alkyl, $R^4$ is H or alkyl, $R^5$ is OH, $NHR^6$, alkyl, aryl or substituted aryl, and $R^6$ is aryl or $CONH_2$; and $X^-$ is an anion.

* * * * *